United States Patent [19]
Moring

[11] 3,958,431
[45] May 25, 1976

[54] UNIVERSAL JOINT AND METHOD FOR MAKING THE SAME

[75] Inventor: Rodger L. Moring, Yorkville, Ill.

[73] Assignee: Caterpillar Tractor Co., Peoria, Ill.

[22] Filed: Apr. 19, 1974

[21] Appl. No.: 462,379

[52] U.S. Cl. ............................................. 64/17 A
[51] Int. Cl.² .......................................... F16D 3/26
[58] Field of Search .............. 64/17 A, 17 R, 17 SP, 64/18

[56] References Cited
UNITED STATES PATENTS

| | | | |
|---|---|---|---|
| 2,300,658 | 11/1942 | Dunn | 64/17 A |
| 3,481,159 | 12/1973 | Kayser | 64/17 A |
| 3,574,277 | 4/1971 | Paine | 64/18 |
| 3,645,115 | 2/1972 | Shotwell et al. | 64/17 A |
| 3,721,110 | 3/1973 | Borneman | 64/17 A |

*Primary Examiner*—Samuel Scott
*Assistant Examiner*—Randall Heald
*Attorney, Agent, or Firm*—Phillips, Moore, Weissenberger Lempio & Strabala

[57] ABSTRACT

A universal joint comprises a pair of yoke assemblies universally connected by a journal cross having each of its journals rotatably mounted in a cylindrical bearing race. The bearing race is closely fitted within a like-shaped bore preformed between an end cap and a respective support arm of one of the yoke assemblies. The end cap and support arm abut at substantial bearing surfaces thereof disposed on either side of the bearing race.

4 Claims, 3 Drawing Figures

U.S. Patent May 25, 1976 3,958,431
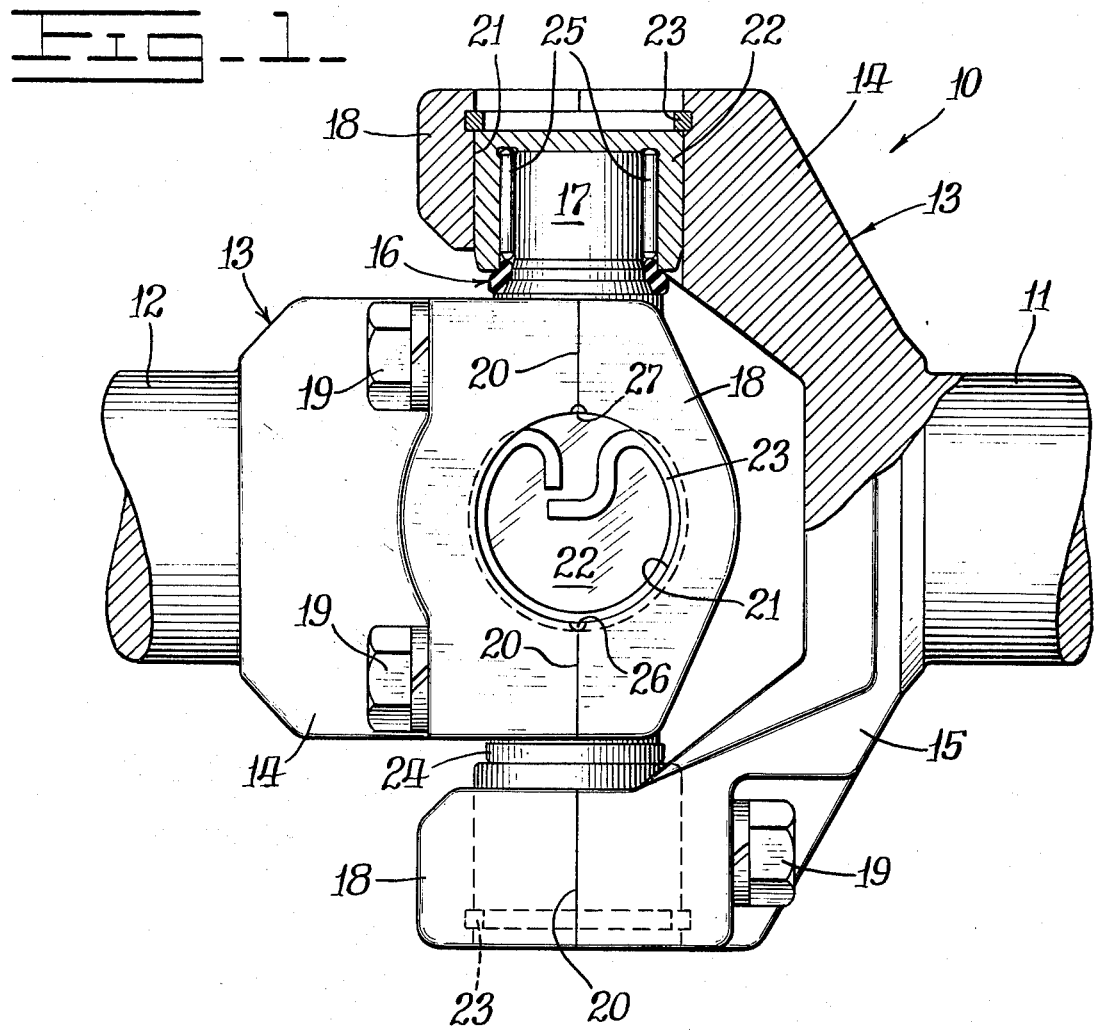
Fig. 1
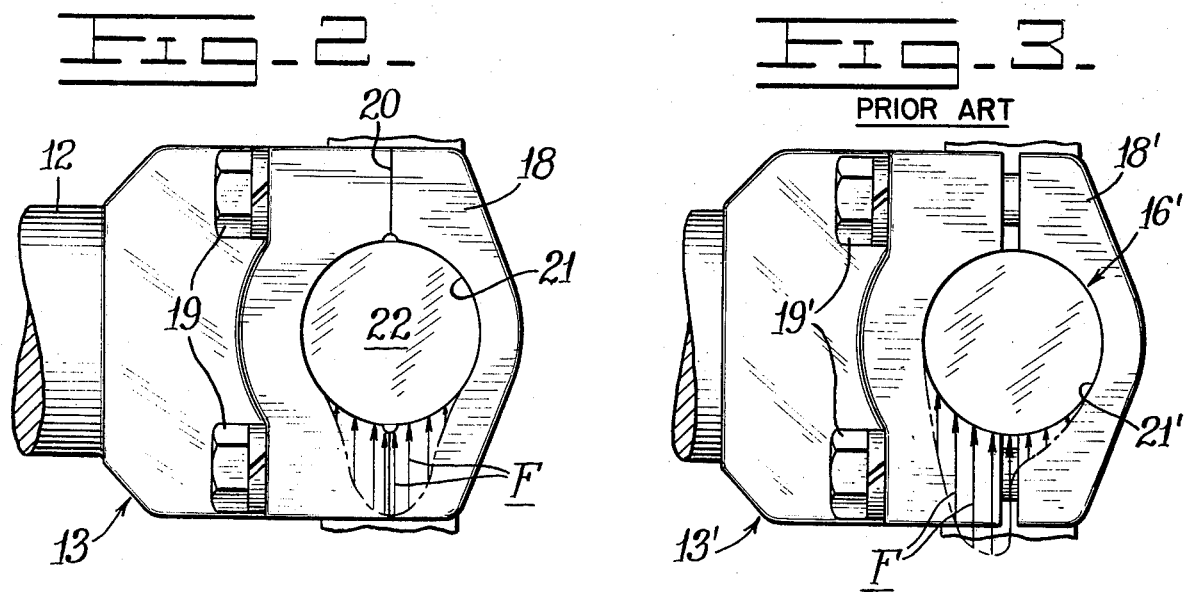
Fig. 2
Fig. 3 PRIOR ART

UNIVERSAL JOINT AND METHOD FOR MAKING THE SAME

BACKGROUND OF THE INVENTION

A conventional universal joint normally comprises a pair of one piece yokes having a cylindrical bearing journal press-fitted or otherwise suitably secured into each arm thereof. The assembly of such a construction requires special tooling and is made difficult since the journal cross must be prepositioned prior to installation of the bearing journals. Such problem has been somewhat alleviated by the advent of universal joints utilizing an end cap for releasably attaching each such bearing journal to a support arm of a yoke assembly. However, the premachined yoke assemblies and end caps are normally mis-matched and do not draw tightly together, giving rise to torque transmission problems.

SUMMARY OF THE INVENTION

An object of this invention is to overcome the above, briefly described problems by providing an efficient, non-complex and economical universal joint and an expeditious method for making the same. The universal joint comprises a pair of yoke assemblies each having a pair of spaced support arms universally connected to each other by four cylindrical journals of a journal cross. Each of the journals is rotatably mounted on a respective one of the support arms by mounting means comprising an end cap releasably attached to the suport arm at abutting bearing surfaces thereof and a cylindrical bearing race closely fitted within a bore formed between the end cap and the suport arm. The bore is pre-machined while the end cap and support are attached together to assure a substantially uniform torque transmission therebetween during universal joint operation.

BRIEF DESCRIPTION OF THE DRAWINGS

Other objects of this invention will become apparent from the following description and accompanying drawings wherein:

FIG. 1 is a partially sectioned, side elevational view of a universal joint embodying this invention;

FIG. 2 is a reduced and partial view of the universal joint having arrows superimposed thereon to depict torque transmission forces occurring during operation thereof; and FIG. 3 is a view similar to FIG. 2, but illustrating a prior art universal joint construction and torque transmission forces occurring during operation thereof.

DETAILED DESCRIPTION

FIG. 1 illustrates a universal joint 10 connecting an input shaft 11 to an output shaft 12. The universal joint comprises a pair of substantially identical yoke assemblies 13, each having a pair of spaced support arms 14 and 15 universally interconnected by a journal cross 16. The journal cross has four cylindrical journals 17 (one shown) extending radially outwardly therefrom with each pair of circumferentially adjacent journals being disposed in perpendicular relationship relative to each other.

Mounting means for rotatably mounting each journal 17 on a respective support arm 14 or 15 comprises an end cap 18 releasably attached on the support arm by a pair of cap screws 19. The end cap abuts the support arm at substantial flat bearing surfaces 20 disposed on either side of journal 17. A substantially uninterrupted cylindrical bore 21, intersecting abutting bearing surfaces 20, is defined between the end cap and support arm to retain a closely fitted cylindrical bearing race 22 therein.

The closed end of the cup-shaped bearing race is engaged by a snap ring 23 whereas the opposite, open end thereof is engaged by a ring seal 24 for lubricant sealing purposes. Journal 17 is mounted for limited rotation in the bearing race by a plurality of circumferentially disposed needle bearing 25.

During the manufacture of the universal joint, flat bearing surfaces are preferably pre-machined on precast end caps 18 which are then each attached to a respective yoke assembly 13 by cap screws 19. Bores 21 are then suitably machined to intersect such bearing surfaces and to substantially conform to the outside diameter of cylindrical bearing race 22. If so desired, elongated reliefs 26 and 27 may be formed at the inner ends of bearing surfaces 20 to allow for a slight mismatch or centerline shift between the yoke and the cap to thereby facilitate the machining of a substantially perfect bore 21. Upon completion of such machining, the end caps are removed and the structures are reassembled to their FIG. 1 operational condition.

Referring to FIG. 2, the closely matched fit between the outer surface of bearing race 22 and the cylindrical surface defining bore 21, as well as the substantial bearing surface contact 20 between the end cap and the support arm, will function to uniformly and efficiently transmit torque therebetween, as depicted by force arrows F. In contrast thereto, FIG. 3 illustrates a prior art universal joint wherein corresponding force arrows F' are shown in a non-uniform dispersion.

The illustrated mismatch in FIG. 3, between an end cap 18' and a yoke assembly 13', will tend to cause a journal of a journal cross 16' to "roll-out" of contact with respect to an interrupted bore 21' of yoke assembly 13' to thus apply a twisting force on cap screws 19'. Thus, the magnitude of the torque transferred in the FIG. 3 universal joint is substantially less than that transferred by the universal joint of this invention.

I claim:

1. A universal joint adapted to connect an input shaft to an output shaft comprising first and second yoke assemblies each having a pair of spaced support arms, a journal cross, having four cylindrical journals extending radially outwardly therefrom, universally interconnecting said first and second yoke assemblies together, mounting means rotatably mounting each one of said journals on a respective one of said support arms comprising fastening means releasably attaching an end cap on a free end of said support arm at abutting and co-planar and flat bearing surfaces thereof, means defining a substantially uninterrupted cylindrical bore of uniform diameter formed completely through and between said end cap and said support arm and a cylindrical bearing race closely fitted within said bore and rotatably mounting said journal therein, said bearing race being cup shaped to dispose a closed outer end thereof on a free end of a respective journal and an open inner end thereof adjacent to the other one of said first and second yoke assemblies, retaining means comprising a snap ring operatively engaged between the outer end of said bearing race and a respective support arm for preventing said bearing race from moving radially outwardly relative to a respective journal, and means forming a relief solely at each radially inner edge of each of said bearing surfaces, said relief extending the entire axial length of a respective bore.

2. The universal joint of claim 1 wherein bearing means rotatably mount each said journal in a respective bearing race.

3. The universal joint of claim 1 wherein said bearing means comprises a plurality of needle bearings circumferentially disposed radially between said journal and said bearing race.

4. The universal joint of claim 1 further comprising an annular sealing means disposed between the inner end of said bearing race and a respective journal.

* * * * *

UNITED STATES PATENT AND TRADEMARK OFFICE
CERTIFICATE OF CORRECTION

PATENT NO. : 3,958,431
DATED : May 25, 1976
INVENTOR(S) : RODGER L. MORING

It is certified that error appears in the above-identified patent and that said Letters Patent are hereby corrected as shown below:

The title of this patent, shown on the title page at section [54] and at the top of Column 1, should be:

"UNIVERSAL JOINT"

Signed and Sealed this twenty-third Day of August 1977

[SEAL]

Attest:

RUTH C. MASON
*Attesting Officer*

C. MARSHALL DANN
*Commissioner of Patents and Trademarks*